Feb. 2, 1954
J. K. LUND
2,668,014
VACUUM CONTROL
Filed June 24, 1950
2 Sheets-Sheet 1
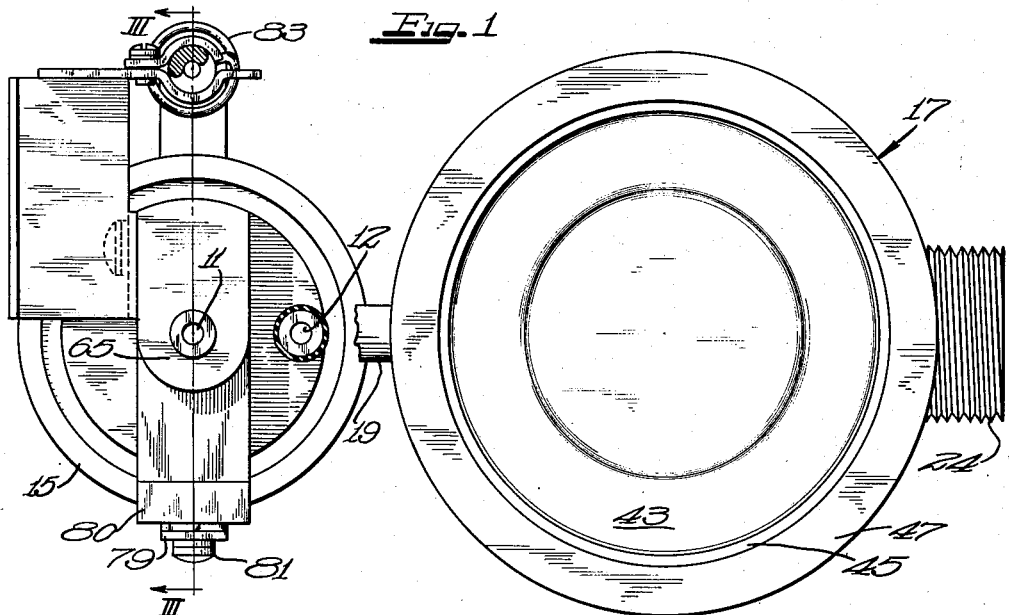
Inventor
James K. Lund
by The Firm of Charles W. Hills Attys.

Feb. 2, 1954 — J. K. LUND — 2,668,014
VACUUM CONTROL
Filed June 24, 1950 — 2 Sheets-Sheet 2
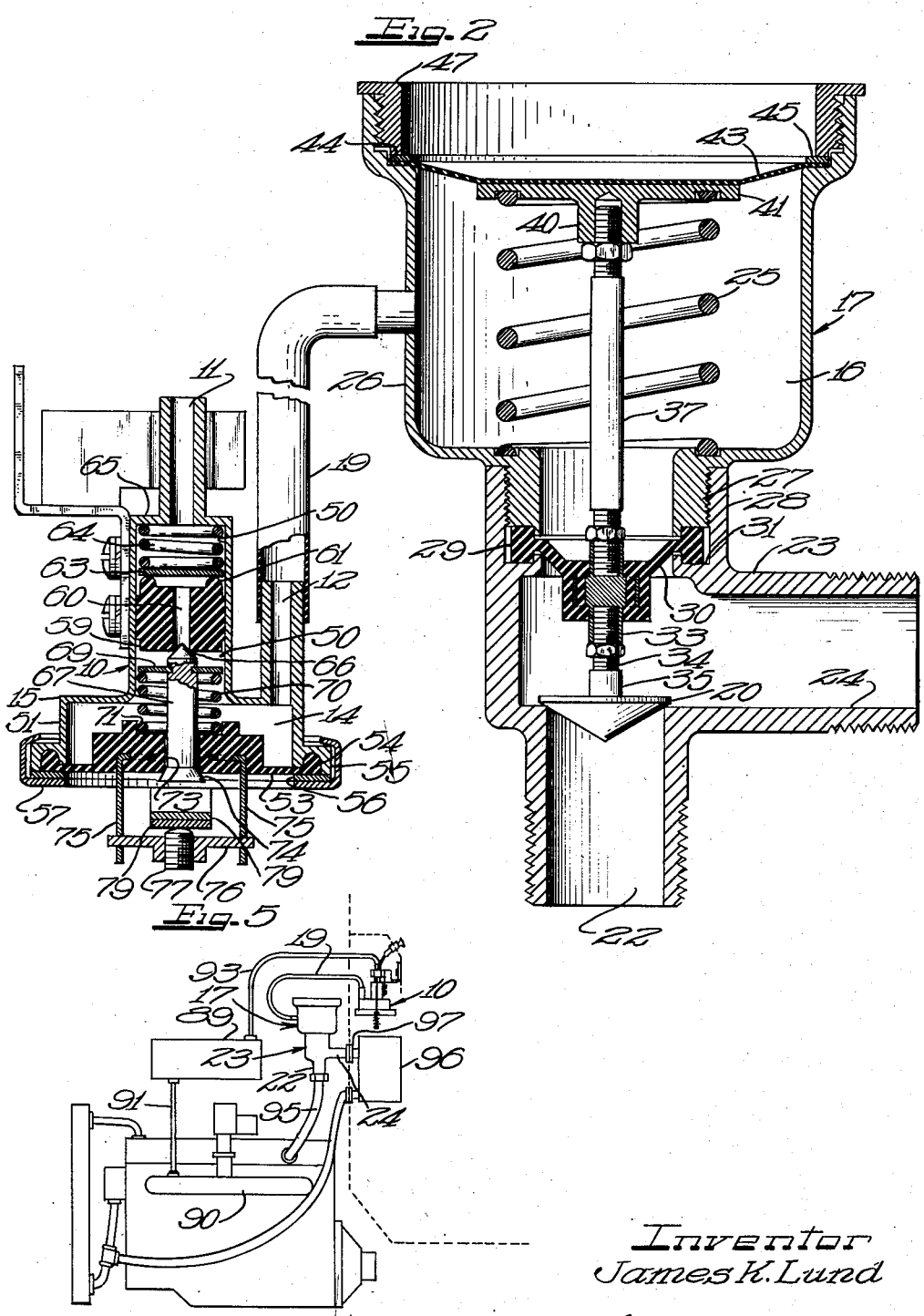
Inventor
James K. Lund
by The Firm of Charles W. Hills
Attys.

Patented Feb. 2, 1954

2,668,014

UNITED STATES PATENT OFFICE 2,668,014

VACUUM CONTROL

James K. Lund, Chicago, Ill., assignor to The Dole Valve Company, Chicago, Ill., a corporation of Illinois Application June 24, 1950, Serial No. 170,140

6 Claims. (Cl. 237—8)

This invention relates to improvements in vacuum control devices and more particularly relates to a new and improved form of vacuum control device adapted to control the internal temperature of the passenger compartment of an automobile or truck.

An object of my invention is to provide a simple and novel form of control device arranged to control the vacuum of a vacuum motor in accordance with predetermined temperature changes.

Another object of my invention is to provide a novel form of temperature control utilizing vacuum as a power source to operate a heat control system.

Another object of my invention is to provide an efficient but inexpensive control adapted to control the internal temperature of a vehicle, such as a passenger car or truck, by varying the volume of fluid flowing through the car heater by the vacuum produced at the intake manifold of the car and by controlling the amount of vacuum in accordance with predetermined temperature changes within the car.

A further and more specific object of my invention is to provide a control device adapted to control the internal temperature of a body of a vehicle such as a passenger car or truck heated by a hot water heater having a valve controlling the volume of hot water supplied to the heater, by utilizing a vacuum motor to control operation of the valve and a vacuum equalizing and control valve to control the amount of vacuum in the motor in accordance with temperature changes in the body of the car.

A further object of my invention is to provide a novel form of vacuum control valve particularly adapted to control the vacuum of a vacuum motor and arranged to cope with the variable vacuum conditions encountered in internal combustion engines, the intake of which is utilized as a source of vacuum for the vacuum motor.

A further object of my invention is to provide an inexpensive, simple and efficient form of temperature responsive vacuum control valve controlling the vacuum of a vacuum control device operated by an intake manifold of an internal combustion engine and having a vacuum equalizing and control chamber with valve means therein for increasing the vacuum within said control chamber or for admitting air therein to decrease the vacuum in said chamber, and utilizing a temperature responsive element to operate the valve means.

These and other objects of my invention will appear from time to time as the following specification proceeds and with reference to the accompanying drawings wherein:

Figure 1 is a plan view of a vacuum control constructed in accordance with my invention with certain parts broken away and shown in section;

Figure 2 is a longitudinal sectional view taken through the vacuum control shown in Figure 1;

Figure 3 is a transverse sectional view taken substantially along lines III—III of Figure 1;

Figure 4 is a side view of the vacuum control valve shown in Figure 1; and

Figure 5 is a diagrammatic view showing a form of control having my invention embodied therein.

As shown on the drawings:

A vacuum control valve 10, which may be mounted within a body of a car, is shown as having an outlet 11 leading therefrom which may be connected directly to the intake manifold of an internal combustion engine, which may serve as a source of vacuum. An inlet 12 leads to a vacuum equalizing and control chamber 14 formed in a casing 15 for the valve. The inlet 12 is connected to a vacuum chamber 16 of a vacuum motor 17 through a flexible conduit 19 and serves to evacuate the air from said chamber by suction and thus to create a vacuum therein. The vacuum motor 17 is operatively connected with a valve 20 seated on the end of a fluid inlet 22 of a fitting 23 adapted to be connected to a source of hot water, such as the cooling system of the engine for propelling the car. A fluid outlet 24 of the fitting 23 is herein shown as extending at right angles to the inlet 22 and may be connected to a car heater. The amount of heat given off of the hot water heater is thus varied by varying the volume of hot water supplied thereto, controlled by the valve 20 the operation of which is controlled by the vacuum motor 17 operated by vacuum against a spring 25 therein.

The vacuum motor 17 is herein shown as being enclosed in a bowl like casing 26 having a reduced lower end portion 27, threaded within an upright projection 28 of the fitting 23. The lower end of the reduced end 27 of the casing 26 abuts the upper side of an annular flanged portion 29 of a diaphragm 30, extending across the open portion of the upright end 28 of the fitting 23. The reduced end 27 serves to clamp the diaphragm 30 in an annular recess 31 formed in the upright projection 28 and to hold said diaphragm to flex upon vertical movement of the valve 20 from one position to another.

The diaphragm 30 may be made from a suitable flexible material, such as rubber or neoprene, and has a coupling member 33 imbedded in its center and extending from opposite sides thereof. Opposite ends of coupling member 33 are herein shown as being internally threaded and the lower threaded end thereof has a threaded rod 34 threaded therein. The opposite end of the threaded rod 34 is threaded in an upright stem 35 of the valve 20. The opposite or upper threaded end of the coupling 33 has the lower threaded end of a rod 37 threaded therein. The end of the rod 37 opposite the coupling 33 extends through the chamber 16 and is threaded in a depending boss 40 of a diaphragm plate 41. The diaphragm plate 41 is herein shown as being secured to the under side of a flexible diaphragm 43, closing the top of the vacuum chamber 16. The diaphragm 43 may also be made from a suitable flexible material, such as rubber or neoprene and is clamped to an annular shouldered surface 44 of the casing 16 by means of an annular ring 45 engaging the top outer surface of said diaphragm 43 and an annular retaining nut 47 threaded in the open top portion of the casing 26 and engaging said ring 45. The spring 25 is interposed between the bottom of the chamber 16 and the under side of the diaphragm plate 41 and serves to urge said plate and diaphragm in a direction to open the valve 20 and allow the free flow of liquid from the inlet 22 through the outlet 24 of the fitting, to and through the hot water heater of the car. Thus when the vacuum within the vacuum control chamber 16 is less than the pressure exerted by the spring 25 to open the valve 20, said valve will open, and when the vacuum within said vacuum chamber exerts a greater inward pressure differential across the diaphragms 43 and 30 than the pressure exerted by the spring 25, the valve 20 will close and block the passage of hot water to the car heater.

The vacuum control valve 10 is provided to control the amount of vacuum created in the vacuum chamber 16 by the suction of the intake manifold and also to equalize or regulate the vacuum in said chamber to cope with variable vacuum conditions caused by variations in engine loads, which vacuum may fluctuate from practically nothing to a maximum of approximately 25" of mercury. The vacuum control valve 10 may be located within the car body at a place preferably remote from the heater, yet convenient to the car engine and the vacuum motor 17, as beneath the dashboard of the car on the opposite side of the car from the heater, when the heater is mounted under the dashboard, or on the steering column of the car.

The casing 15 of the vacuum control valve has a reduced portion, the inside of which forms a valve chamber 50 communicating with the vacuum equalizing and control chamber 14 defined by the inner margins of an enlarged portion 51 of said casing. As herein shown, the outlet 11 leads from the outer end of the reduced portion 50 of the casing 15. The vacuum control chamber 14 opens to the opposite end of the valve casing from the outlet 11 and the open end thereof is shown as being closed by a flexible diaphragm 53. The flexible diaphragm 53 may be molded from rubber, neoprene or any other suitable flexible material and is shown as having an annular bead 54 extending inwardly from the outer side thereof and recessed within a corresponding recessed portion formed in a flanged end 55 of the casing 15. The diaphragm 53 is secured to the end of the casing 15 by means of an annular ring 56 abutting the outer side thereof on the opposite side thereof from the bead 54 and suitably clamped in engagement with said diaphragm, by means of a clamping ring 57.

A reduced passageway from the equalizing and control chamber 14 to the outlet 11 is formed in the valve chamber 50 of the casing 15 by means of a plug 59 mounted within said valve chamber and having a passageway 60 extending through its center. The plug 59 may be made from any suitable material and is herein shown as being made from a yieldable material such as rubber or neoprene. The face of the plug 59, adjacent the outlet 11 is shown as having an annular bead 61 projecting therefrom and forming a seat for a check valve closing the passageway 60. The check valve is herein shown as consisting of a disk 63 yieldably held in engagement with the bead 61 by a lightly loaded spring 64. The spring 64 is interposed between the opposite side of the disk 63 from the bead 61 and a reduced end portion 65 of the casing 15, which has the outlet 11 leading therefrom. The spring 64 loads the disk 63 relatively lightly to open when the suction in the outlet 11 is greater than the vacuum in the chamber 14 plus the force exerted by said spring.

The end of the passageway 60 opposite from the check valve formed by the disk 63 forms a seat for a valve 66 formed by the conical end of a valve stem 67. A snap ring 69 of considerably less diameter than the inside diameter of the valve chamber 50 is shown as being snapped on the stem 67 adjacent the conical end thereof and as being abutted at its side opposite the valve 66 by a compression spring 70. The compression spring 70 is seated in an annular recess 71, formed in an enlarged inwardly projecting central portion of the diaphragm 53, and urges the valve 66 into a closed position.

The diaphragm 53 has a passageway 73 leading therethrough from its inner to its outer side, through which extends the stem 67 of the valve 66. The end of the stem 67 opposite from the valve 66 is herein shown as being of an enlarged frusto conical formation and forms the valve 74 which may open to admit air at atmospheric pressure into the vacuum equalizing and control chamber 14, to reduce the vacuum therein, when the diaphragm 53 is flexed inwardly against the spring 70 by a predetermined vacuum within the chamber 14. A plurality of spaced hanger members 75, 75 having inwardly turned upper ends embedded within the diaphragm 53 and depending therefrom are shown as having a cross bar 76 mounted thereon in vertically spaced relation with respect to the diaphragm 53 and casing 15. A bearing screw 77 is threaded through the center of the cross bar 76 from its outer end and has a rounded inner end abutting the bottom of a bi-metal temperature responsive element 79.

The bi-metal temperature responsive element 79 is shown in Figure 3 as extending downwardly along one side of the valve casing 15 in spaced relation with respect thereto and as abutting the outer side of a spacer 80. The element 79 is secured to the casing 15 by means of machine screws 81—81 extending through said element and the spacer 80, and threaded within a side wall of the casing 15. The bi-metal element 79 extends inwardly across the bottom of the casing 15 in vertically spaced relation with respect to the diaphragm 53 between the hangers 75—75 into bearing engagement with the inner end of the bearing screw 77. The outer end of the element 79 is then shown as extending downwardly and then outwardly, and as having a tension spring 83 connected to its end, and extending upwardly therefrom. The tension of the spring 83 is adjustable to increase the force against which the element must react to open the valve 66, and thus to increase the temperature at which said valve will open. It is obvious from the foregoing that the bi-metal element 79 exerts a pressure against the bearing screw 77 and diaphragm 53, which is in balance with the differential in pressure across the diaphragm, except when a new control position is necessary due to a change in temperature within the car body.

The end of the tension spring 83 opposite from the bi-metal element 79 may be connected to an adjusting rod 84, arranged to vary the tension of said spring under the control of the driver of the car. The adjusting rod 84 may be an ordinary choke rod commonly used on cars.

When the outlet 11 is connected to the intake manifold of the engine of the car and the inlet 12 is connected to the chamber 16 of the vacuum motor 17, and the engine is running and the suction in the intake manifold becomes greater than the pressure exerted on the check valve disk 63 by the spring 64, said check valve disk will move to an open position. If the temperature in the car rises a predetermined amount, said bi-metal element will flex the diaphragm 53 outwardly and open the valve 66. This will create or increase the vacuum in the chamber 14 and the vacuum chamber 16 of the vacuum motor 17 to the point where said motor will close the valve 20 and block the passage of fluid to the heater of the car. When, however, the vacuum in the chamber 14 exceeds a predetermined value or the temperature in the car body is reduced to a point where it is necessary to supply heat to the car heater, the bi-metal element 79 will allow the vacuum in the chamber 14 to flex the diaphragm 53 inwardly against the spring 70, to open the valve 74 and allow air at atmospheric pressure to enter the chamber 14 and reduce the vacuum therein. Where it is necessary to supply heat to the car, determined by the setting of the bi-metal element 79, the vacuum will be reduced to a point where the spring 25 will open the valve 20. As the vacuum in the chamber 14 becomes balanced and the differential in pressure across the diaphragm 53 balances the outward force exerted by the bi-metal element 79, the valve 74 will again close. As the vacuum becomes too low for the temperature conditions for which the bi-metal element 79 is set, the valve 66 will open to increase the vacuum in the chamber 14 and effect closing of the valve 20.

The vacuum equalizing and control chamber 14 thus balances the pressure differential across the diaphragm 53 against the pressure exerted against said diaphragm by the bi-metal element 79, and said diaphragm and bi-metal element and the valves 74 and 66, serve to supply the required vacuum to the chamber 16 and also to compensate for varying vacuums in the intake manifold of the car.

Figure 5, diagrammatically shows a form in which the control of my invention may be embodied, which utilizes a vacuum tank 89, acting as an accumulator, to provide a more constant source of vacuum than can be obtained by directly connecting said vacuum control valve to the intake manifold of the car engine. The vacuum tank 89 may be of any well known form commonly used to provide a relative constant vacuum to windshield wipers or the like, driven from the car engine, and while not necessary, may be provided to correct extreme conditions where the vacuum in the intake manifold may be substantially zero and to prevent a lag in the closing of the valve 20 which ordinarily is not taken care of by the vacuum control valve 10. In Figure 5, the vacuum tank 89 is shown as being connected to an intake manifold 90 of a car engine by means of a vacuum line 91. A vacuum line 93 connects the tank 89 to the outlet 11 of a vacuum control valve 10, which is shown in this figure as being mounted on the inside or underneath the dashboard of the car. The vacuum line 19 is connected from the inlet passageway 12 of the vacuum control valve 10 to the casing of the vacuum motor 17 in communication with the chamber 16 thereof. The inlet 22 of the fitting 23 is shown as being connected to a source of hot water from the engine block as by a conduit 95, while the outlet 24 of said fitting is shown as supplying hot water to a car heater 96 through a conduit 97. A conduit 99 connects the discharge side of the heater 96 to the return for the cooling system of the car engine.

It will be understood that various modifications and variations of the present invention may be effected without departing from the scope of the novel concepts thereof.

I claim as my invention:

1. A car heater control adapted to control the amount of heat supplied thereby and the internal temperature of a car body, a valve controlling the volume of hot fluid supplied to the heater, a vacuum motor operatively connected with said valve and having a spring connected to move said valve to one position, a vacuum equalizing chamber, and a member responsive to the vacuum therein connected to move said valve against said spring to another position, a vacuum control valve adapted to be mounted within the car body, a vacuum line adapted to be connected from a source of vacuum to said vacuum control valve, another vacuum line connected from said vacuum control valve to said vacuum motor, a bi-metal temperature responsive element connected to open said valve and increase the vacuum in said motor upon predetermined temperature changes within the car body and vacuum operated means operable to overbalance said temperature responsive element and close said valve member and open said vacuum equalizing chamber to atmosphere.

2. A car heater control adapted to control the amount of heat supplied thereby and the internal temperature of a car body comprising a valve controlling the volume of hot fluid supplied to the heater, a vacuum motor operatively connected with said valve and having a spring connected to move said valve to one position, a vacuum chamber, and a member responsive to the vacuum therein connected to move said valve against said spring to another position, a vacuum control valve adapted to be mounted within the car body, a vacuum line adapted to be connected from a source of vacuum to said vacuum control valve, another vacuum line connected from said vacuum control valve to said vacuum motor, said vacuum control valve having a vacuum equalizing chamber connected in said vacuum line to said vacuum motor and having a valve opening said chamber to said first vacuum line and another valve opening said equalizing chamber to the atmosphere, a bi-metal temperature responsive element operatively connected to both of said valves to open said first valve and increase the vacuum in said chamber and motor upon a predetermined temperature rise within the car body, and a diaphragm closing said vacuum equalizing chamber and operating to open said second valve and close said first valve against said temperature responsive element upon a predetermined decrease of temperature within the car body.

3. In a car heater control, a valve controlling the volume of hot fluid supplied to the heater, a vacuum motor for operating said valve and having a vacuum chamber having a member therein responsive to the vacuum in said chamber, to move said valve to one position, a spring effective to move said valve to another position, a vacuum control valve adapted to be mounted within the car body, a vacuum line connected from a source of vacuum to said vacuum control valve, another vacuum line connected from said vacuum control valve to said vacuum motor, said vacuum control valve having a vacuum equalizing chamber therein in communication with said vacuum line to said vacuum motor, two valves within said equalizing chamber controlling the communication between said first vacuum line and said equalizing chamber and from said equalizing chamber to the atmosphere, means operating said valves in accordance with the vacuum within said chamber, and a temperature responsive element connected with said operating means to operate said valves in accordance with the temperature within the car body.

4. In a control device adapted to control the internal temperature of the passenger compartment of an automotive vehicle having an internal combustion engine having an intake manifold and a hot water heater within the passenger compartment, the improvements comprising a valve controlling the volume of hot water flowing through said heater, a suction operated motor connected to operate said valve, a vacuum line from said manifold to said suction operated motor, a vacuum control valve connected in said vacuum line to control the vacuum in said suction operated motor and having a vacuum equalizing chamber and valve means therein effective to equalize the vacuum within said chamber regardless of variations in the vacuum at said manifold due to changes in load on the motor, and a temperature responsive member connected with said valve means for opening the same, and a vacuum responsive member cooperative with said temperature responsive member to vary the vacuum within said vacuum chamber in accordance with temperature and vacuum changes.

5. In a control device adapted to control the internal temperature of the passenger compartment of an automotive vehicle having an internal combustion engine having an intake manifold and having a hot water heater within the passenger compartment, the improvements comprising a valve controlling the volume of hot water flowing through said heater, a suction operated motor connected with said valve to control operation thereof, a vacuum line from said manifold to said suction operated motor, a vacuum control valve within the passenger compartment, connected in said vacuum line and having a vacuum equalizing chamber and a valve member therein opening said chamber to a source of vacuum or venting said chamber to atmosphere to assure a uniform vacuum in said motor regardless of variations in vacuum at the manifold, a bimetal temperature responsive element operatively connected with said valve member to open or close said valve member upon changes in temperature within the passenger compartment, and pressure responsive means cooperating with said temperature responsive element, for venting said vacuum equalizing chamber to the atmosphere.

6. A car heater control adapted to control the amount of heat supplied by the heater and the internal temperature of the passenger compartment of an automotive vehicle, a valve controlling the volume of hot fluid supplied to the heater and spring biased in one position, a vacuum motor operatively connected with said valve for moving said valve to another position against its spring bias, a vacuum control valve within the car body and having connection with said motor, to control the supply of vacuum therein and having a vacuum equalizing chamber and a valve member therein operable in accordance with temperature changes within the car and in accordance with changes in vacuum at the source of vacuum, a temperature responsive element operatively connected to said valve member, to operate said valve member to increase the vacuum within said vacuum motor upon a predetermined temperature rise within the car body, and pressure responsive means cooperating with said temperature responsive element and operated by vacuum in said vacuum equalizing chamber for reducing the vacuum therein upon a reduction in temperature within the car body or an excessive supply of vacuum at the source.

JAMES K. LUND.

References Cited in the file of this patent
UNITED STATES PATENTS

| Number | Name | Date |
|---|---|---|
| 554,398 | Powers | Feb. 11, 1896 |
| 773,078 | Johnson | Oct. 25, 1904 |
| 1,611,554 | Pinkham | Dec. 21, 1926 |
| 1,764,799 | Kysor | June 17, 1930 |
| 1,922,266 | Toman | Aug. 15, 1933 |
| 2,199,416 | Paulson | May 7, 1940 |
| 2,203,477 | Wahlberg | June 4, 1940 |
| 2,213,018 | Perkins | Aug. 27, 1940 |
| 2,304,642 | Hans | Dec. 8, 1942 |
| 2,421,565 | Klug | June 3, 1947 |
| 2,463,908 | Rose | Mar. 8, 1949 |
| 2,490,919 | Raney | Dec. 13, 1949 |